United States Patent [19]

Kang

[11] Patent Number: 5,443,571
[45] Date of Patent: Aug. 22, 1995

[54] WRAP AROUND SIDE COVER FOR A SPINNING FISHING REEL

[75] Inventor: Young Kang, Seoul, Rep. of Korea

[73] Assignee: Zebco Corporation, Tulsa, Okla.

[21] Appl. No.: 916,225

[22] Filed: Jul. 15, 1992

[51] Int. Cl.$^6$ ............................................. A01K 89/01
[52] U.S. Cl. ................... 242/311; D22/141
[58] Field of Search ............... 242/311, 310, 246, 241; D22/141

[56] References Cited

U.S. PATENT DOCUMENTS

| 2,344,209 | 3/1944 | Lowe | 242/246 |
|---|---|---|---|
| 3,144,217 | 8/1964 | Wood, Jr. | 242/246 |
| 3,788,570 | 1/1974 | Yamazaki et al. | 242/311 |
| 4,676,450 | 6/1987 | Carpenter et al. | 242/233 |
| 4,773,611 | 9/1988 | Kaneko | 242/241 |
| 5,240,202 | 8/1993 | Park | 242/246 |

*Primary Examiner*—Daniel P. Stodola
*Assistant Examiner*—Michael R. Mansen
*Attorney, Agent, or Firm*—Wood, Phillips, VanSanten, Clark & Mortimer

[57] ABSTRACT

A fishing reel having a frame including a housing defining a receptacle for an operating mechanism and having a front and rear and opposite side walls, a rotor mounted to the reel frame for rotation about a fore and aft axis, a line carrying spool, a bail assembly mounted to the rotor for movement selectively between a cast position and a retrieve position, and structure for moving the line carrying spool in a reciprocating path in a fore and aft direction to cause the bail assembly to evenly direct line onto the line carrying spool as the rotor is operated with the bail assembly in its retrieve position. The frame housing has first and second housing parts. One of the first and second housing parts defines a rear wall to support a portion of the spool moving structure. The other of the first and second parts has a first section defining at least a portion of one of the side walls. There is a second section formed integrally with the first section to cover at least a part of the rear wall.

21 Claims, 2 Drawing Sheets

WRAP AROUND SIDE COVER FOR A SPINNING FISHING REEL

BACKGROUND OF THE INVENTION

1. Field of the Invention

This invention relates to spinning-type fishing reels and, more particularly, to a housing on the fishing reel for operatively supporting and compactly containing a portion of an operating shaft on the fishing reel.

2. Background Art

Spinning-type fishing reels are well known in the prior art. Typically, a spinning reel has a frame defining a mounting foot for attachment to a rod. A rotor is mounted to the frame for rotation about a fore and aft axis. A line carrying spool is coaxial with the rotor axis and oscillated in a fore and aft direction by operation of a crank handle, which crank handle operation simultaneously rotates the rotor to thereby evenly wrap line on the line carrying spool.

To effect reciprocating movement of the line carrying spool, various mechanisms have been used in the prior art. These various mechanisms normally operate on a shaft extending rearwardly from the line carrying spool into the housing. It is also known to couple a worm shaft to the drive train for the fishing reel. Through an appropriate coupling to the spool shaft, the rotary worm shaft can effect the desired reciprocating motion of the spool.

It is conventional to provide an access opening at the rear of the reel housing to permit assembly of the worm shaft and a retaining bushing. To complete the assembly, a rear cover cap is threaded over the rear of the housing or otherwise suitably attached, as by a screw.

Use of a separate cap to cover the access opening is undesirable for several reasons. First of all, a multiplication of parts results which is always undesirable to a manufacturer. The housing parts defining the opposite side walls are normally screwed together independently of the cap. The assembly is completed by attaching the cap, which accounts for one or two additional parts.

The cap may be a relatively large structure that protrudes at the rear of the fishing reel. It is normally made sufficiently large to facilitate manual assembly. Frequently, this cap makes the reel appear significantly larger than it actually is. This is undesirable and contrary to the goal of fishing reel designers to minimize reel size.

The need for the cap may also increase the overall cost of the reel. Cost is obviously something that designers strive to minimize.

Still further, the cap provides an access opening that may permit entry of foreign matter, such as dust and moisture, to within the reel housing.

SUMMARY OF THE INVENTION

The present invention is specifically directed to overcoming the above enumerated problems in a novel and simple manner.

According to the invention, a fishing reel is provided having a frame including a housing defining a receptacle for an operating mechanism and having a front and rear and opposite side walls, a rotor mounted to the reel frame for rotation about a fore and aft axis, a line carrying spool, a bail assembly mounted to the rotor for movement selectively between a cast position and a retrieve position, and structure for moving the line carrying spool in a reciprocating path in a fore and aft direction to cause the bail assembly to evenly direct line onto the line carrying spool as the rotor is operated with the bail assembly in its retrieve position. The frame housing has first and second housing parts. One of the first and second housing parts defines a rear wall to support a portion of the spool moving structure. The other of the first and second parts has a first section defining at least a portion of one of the side walls. There is a second section formed integrally with the first section to cover at least a part of the rear wall.

Accordingly, the first and second parts can be configured to wrap around the reel at the rear thereof. This eliminates a seam into which foreign matter might migrate.

In one form, the first and second sections are substantially flat and perpendicular to each other.

In a preferred form, the first and second sections are molded from plastic.

In one form, the spool moving structure includes an elongate worm shaft having spaced ends and there is cooperating structure on the rear wall and spool moving structure for maintaining the worm shaft in an operative position. To maintain the worm shaft in the operative position therefor, an end of the worm shaft can be extended into the rear wall. In one form, the worm shaft end extends fully through the rear wall.

To facilitate rotation of the worm shaft and mounting thereof, a bushing can be provided on the rear wall. To facilitate assembly and provide a compact configuration, the rear wall can be constructed with a receptacle for the bushing, which, in one form, is captively held by the other of the first and second housing parts in the receptacle on the rear wall.

In one form, the rear wall is undercut to receive the second section on the other of the first and second walls.

A fastener is extended into both of the second section and the rear wall to maintain the first and second parts in assembled relationship.

In one form, the rearwardly facing surface of the housing behind the worm shaft is substantially flat, with a blended flat surface being defined cooperatively by both the first and second housing parts.

In one form, the flat rearwardly facing surface defines the rearmost part of the fishing reel behind the worm shaft.

The invention also comprehends a housing for a spinning-type fishing reel having a front and rear, spaced side walls, a line carrying spool, structure for reciprocating the line carrying spool, and a structure for directing line onto the reciprocating line carrying spool. The housing has first and second parts, one of which defines a rear wall. There is structure on the rear wall to support at least a portion of the spool reciprocating structure. The other of the first and second housing parts overlies the rear wall and defines the rearmost part of the reel behind the spool reciprocating structure.

In one form, the other of the first and second housing parts has integrally formed first and second sections, with the second section defining a flat tab.

In one form, the one of the first and second housing parts defines a cup-shaped receptacle for a reel operating mechanism and the other of the first and second parts substantially closes the receptacle defined by the one of the first and second housing parts.

DETAILED DESCRIPTION OF THE DRAWINGS

Figure 1:
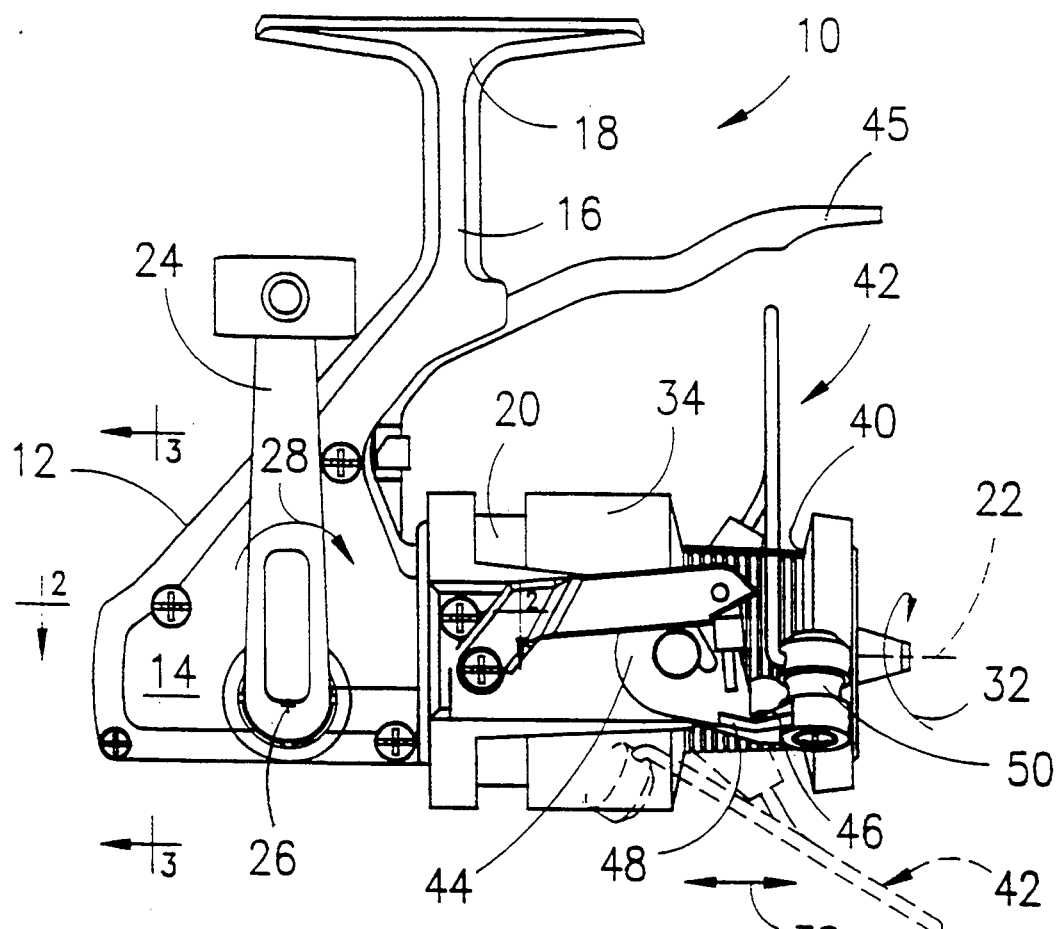
FIG. 1 is a side elevation view of a spinning-type fishing reel incorporating a housing according to the present invention.

A spinning-type fishing reel is shown at 10 having incorporated therein a housing, according to the present invention. Before the details of the present invention are described, the overall reel operation will be briefly described to set the environment for the present invention.

The spinning reel 10 has a frame 12 that contains the internal operating mechanism 13 for the reel 10. A detailed description of the reel operating mechanism 13 is unnecessary to understand the present invention. Only that part that is pertinent to the present invention will be described below. A detailed description of a suitable operating mechanism is set out in U.S. Pat. No. 4,676,450, which is incorporated herein by reference.

The frame has a housing 14 that extends upwardly to define a mounting stem 16, which terminates in a mounting foot 18 that can be attached to a fishing rod (not shown) in conventional fashion.

The frame 12 carries a rotor 20 at its forward end. The rotor 20 is mounted to the frame 12 for rotation about a fore and aft axis 22. Rotation is imparted to the rotor 20 by a crank handle 24. Rotation of the crank handle 24 about a laterally extending axis 26, in the direction of arrow 28, through the operating mechanism 13, effects rotation of the rotor 20 about the axis 22 in the direction of arrow 32, i.e. in a clockwise direction as viewed from the front of the reel 10.

The rotor 20 is configured to direct line onto a line carrying spool 34 in a wrapping motion. An internal oscillating mechanism 36, also operated by the crank handle 24, moves the spool 34 in a reciprocating fore and aft path as indicated by double-headed arrow 38, so that line 40 is evenly distributed along the length of the line carrying spool 34.

The line 40 is wrapped around the spool 34 by a bail assembly 42. The bail assembly 42 is attached to the rotor 20 to follow movement thereof and has spaced arms 44 (one shown) that are pivotably attached to the rotor 20 to allow the bail assembly 42 to be selectively repositioned between the retrieve position, shown in FIG. 1 in solid lines, and a cast position, shown in phantom lines in FIG. 1 by a trigger 45.

The bail arm 44 has a line receptacle 46 defined by a wall 48 on the bail arm 44. The wall 48, in conjunction with a line roller 50, defines a "U" shape for the receptacle 46, which opens in the direction of rotation of the rotor 20 during line retrieval.

Operation of the crank handle 24 simultaneously rotates the rotor 20 and causes the oscillating mechanism 36 to reciprocate the line carrying spool 34 in a fore and aft direction. More specifically, the rotor 20 is carried on a shaft 52 that is journaled for rotation within the frame 12 by a bearing assembly 54. A rearwardly projecting portion of the shaft 52 carries a pinion gear 56 that is in mesh with a face gear, shown schematically at 58. The face gear 58 is rotated about a laterally extending axis 60 by the crank handle 24.

A spool shaft 62 is coaxial with the rotor shaft 52 and projects forwardly to and connects with the line carrying spool 34. The oscillating mechanism 36 causes the spool shaft 62, and thereby the spool 34 fixed thereto, to reciprocate in a fore and aft direction guidingly within the rotor shaft 52.

Figure 2:
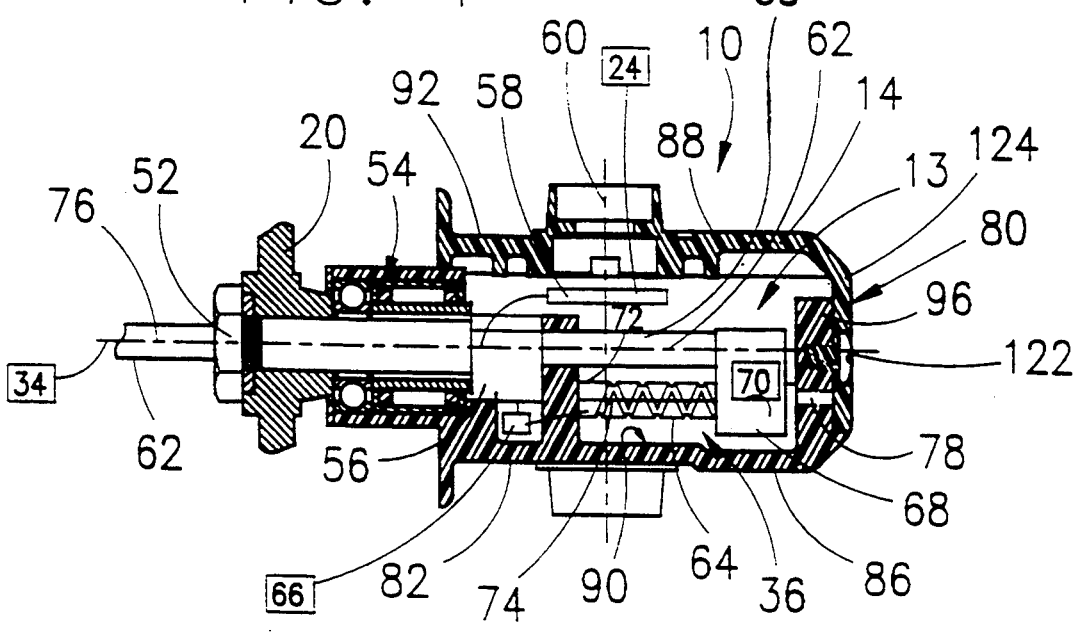
FIG. 2 is a cross-sectional view of reciprocating structure for a line carrying spool on the reel taken along line 2—2 of FIG. 1.
Figure 3:
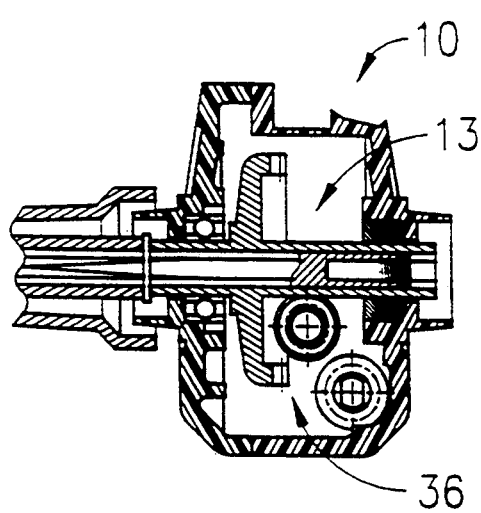
FIG. 3 is a cross-sectional view of the line carrying spool reciprocating structure taken along line 3—3 of FIG. 1.
Figure 4:
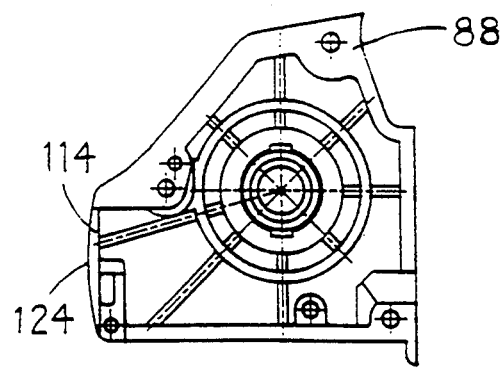
FIG. 4 is a side elevation view of one housing part according to the present invention.
Figure 5:
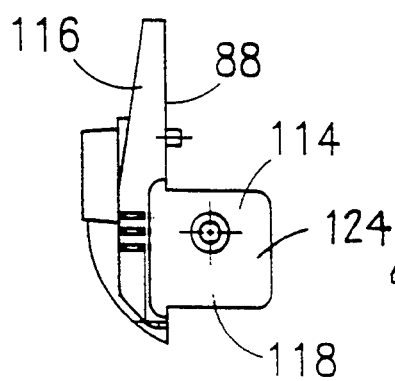
FIG. 5 is an elevation view of the housing part in FIG. 4 taken from the side opposite that in FIG. 4.
Figure 6:
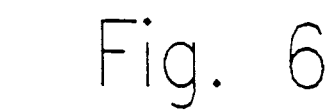
FIG. 6 is an end elevation view of the housing part in FIGS. 4 and 5.
Figure 7:
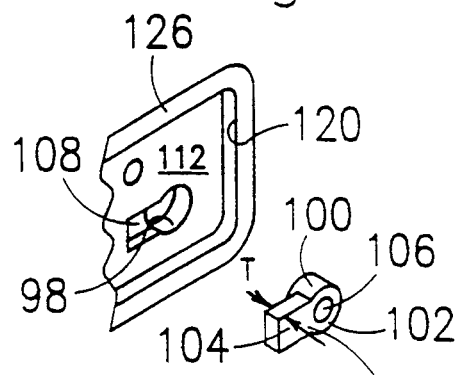
FIG. 7 is a fragmentary, exploded perspective view of a support structure for the end of a worm shaft on the line carrying spool reciprocating structure.

A two-directional worm shaft 64 has a gear, shown schematically at 66 in FIG. 2, which is in mesh with the pinion gear 56. Rotation of the crank shaft 24 and the face gear 58 thereon, effects rotation of the pinion gear 56, which is in turn in mesh with the gear 66 on the worm shaft 64 so that the shaft 52, with the rotor 20 thereon, and worm shaft 64, are simultaneously driven.

The spool shaft 62 has a follower 68 secured at its rear end 69. The follower 68 has a keying element (shown schematically at 70) therewithin that moves guidingly within the spiral groove 72 on the worm shaft 64. As the worm shaft 64 is rotated about its axis 74, which is substantially parallel to the spool shaft axis 76, the follower 68 is caused to move back and forth. The follower 68 moves the spool shaft 62, attached thereto, in the same manner.

To maintain the spacing between the spool and worm shafts 62,64, it is desirable to support the rear end 78 of the worm shaft 64 at the rear 80 of the housing 14.

The present invention provides a novel structure to both support the rear shaft end 78 and define the rear half 82 of the reel housing 14. More particularly, the housing 14 is defined by first and second joinable parts 86,88, respectively. The first housing part 86 defines a laterally opening, cup-shaped receptacle 90 of a size and shape to accommodate the reel operating mechanism 13, including the oscillating mechanism 36. The first housing part is closed by a wall 92 on the second housing part 88 and is secured to the first housing part, as by screws 94.

The first housing part 86 has a rear wall 96 with a through bore 98 to accept the worm shaft end 78. To guide rotation of the worm shaft end 78, a bushing 100 is provided. The bushing, which is preferably made from plastic, has a cylindrical body 102 and a keying tab 104 integrally formed therewith and projecting radially outwardly from the body 102. The body 102 has a through bore 106 to closely receive the worm shaft end 78. The thickness T of the keying tab 104 is slightly less than the axial dimension of the body 102. The tab seats in a receptacle 108 defined by an undercut substantially matched in shape to the cross section of the keying tab 104. With the body 102 seated in the bore 98, the keying tab 104 fits into the receptacle 108 so that the rear surface 110 of the bushing 100 is either flush with or projects slightly from an undercut wall surface 112 on the rear wall 96.

The undercut wall surface 112 has a configuration substantially matched to a tab 114 on the second housing part 88. The second housing part 88 is preferably formed as one piece from plastic and has a first, substantially flat section 116 that blends into a second, transverse, flat section 118, that defines the tab 114. By assembling the second housing part 88 on the first housing part 86, with the operating mechanism 13 in place, the tab 114 overlies the bushing 100 on the wall 112 and closely nests within a receptacle 120 formed by the undercut wall 112. The bushing 100, in its operative position, is thus held captively between the tab 114 and the wall 112. A screw 122 extends through the tab 114 and rear wall 96 to maintain the first and second housing parts 86,88 in assembled relationship.

The housing part 88, in addition to defining one side wall on the housing 14, wraps around to complete and define the rear 80 of the housing 14. The back surface 124 of the tab 114 and U-shaped, rearwardly facing surface 126 on the first housing part 86 cooperatively blend together to define a smooth, neat surface at the rearmost portion of the housing 14. At the same time, the tab 114 holds the bushing 100 in place, which in turn holds the rear end 78 of the worm shaft 64 in operative position on the rear housing wall 96.

With the inventive structure, manufacturing is simplified, the fishing reel 10 retains a compact appearance, and the rear 80 of the reel 10 is effectively sealed against the introduction of foreign matter, such as dust and moisture.

Figure 8:
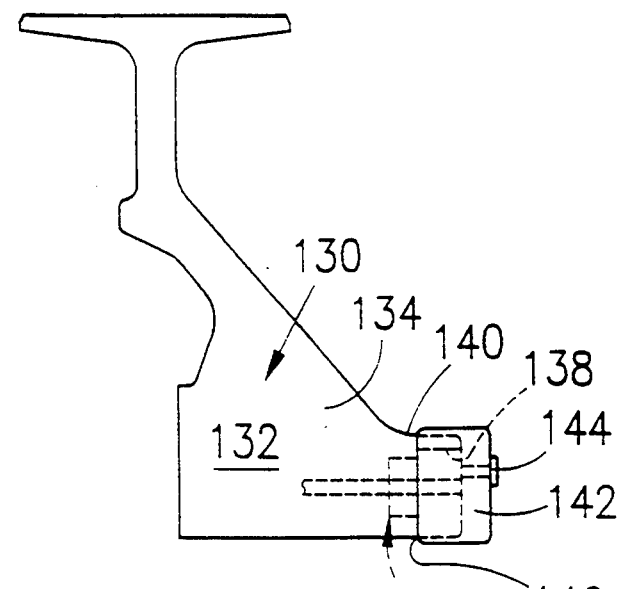
FIG. 8 is a fragmentary, side elevation view of the rear portion of a prior art fishing reel.

The inventive structure offers a substantial improvement over the prior art, as shown in FIG. 8. The reel 130 in FIG. 8 has a housing 132 consisting of joinable side halves 134 (one shown). The spool oscillating mechanism 136 is at least partially assembly through an access opening 138 at the rear 140 of the housing 132. Upon completion of the assembly of the spool oscillating structure 136, the cap 142 is attached. The cap 142 can be threaded onto the rear 140 of the housing 132. Alternatively, a screw 144 can be utilized to maintain the cap 142 in operative position.

It can be seen that the cap 142 represents an obtrusive addition to the reel housing 132 and may detract substantially from the overall appearance. In addition, the opening 146 at the front of the cap 142 provides an entryway for moisture and dirt to migrate between the cap 142 and housing 132.

The foregoing disclosure of specific embodiments is intended to be illustrative of the broad concepts comprehended by the invention.

I claim:

1. A fishing reel comprising:
a frame including a housing defining a receptacle for an operating mechanism,
said frame having a front and rear and opposite side walls;
a rotor;
means for mounting the rotor on the reel frame for rotation about a fore and aft axis;
a line carrying spool;
a bail assembly;
means for mounting the bail assembly to the rotor for movement selectively between a cast position and a retrieve position,
said bail assembly in its retrieve position directing line onto the line carrying spool as the rotor is rotated; and
means for moving the line carrying spool in a reciprocating path in a fore and aft direction to cause the bail assembly to evenly direct line onto the line carrying spool,
said frame housing including first and second housing parts,
one of said first and second housing parts having one piece defining a rear wall to support a portion of the spool moving means and a portion of only one of the side walls at the rear of the housing,
the other of the first and second pans having a first section defining at least a portion of the other of the side walls,
there being a second section formed as one piece with the first section to overlie the rear wall,
said one piece defining the first and second sections not defining any portion of the one of the side walls at the rear of the housing.

2. The fishing reel according to claim 1 wherein the first and second sections are substantially flat and substantially perpendicular to each other.

3. The fishing reel according to claim 1 wherein the first and second sections are molded from plastic.

4. The fishing reel according to claim 1 wherein the spool moving means includes an elongate worm shaft having spaced ends and there are cooperating means on the rear wall and spool moving means for maintaining the worm shaft in an operative position.

5. The fishing reel according to claim 4 wherein one end of the worm shaft extends into the rear wall.

6. The fishing reel according to claim 4 wherein one end of the worm shaft extends fully through the rear wall.

7. The fishing reel according to claim 4 wherein the cooperating means includes a bushing on the rear wall.

8. The fishing reel according to claim 7 wherein the rear wall has a receptacle for the bushing and the other of the first and second housing parts captively hold the bushing in the receptacle in the rear wall.

9. The fishing reel according to claim 4 wherein the rear wall is undercut to receive the second section on the other of the first and second walls.

10. The fishing reel according to claim 9 wherein a fastener is extended into both of the second section and the rear wall to maintain the first and second parts in assembled relationship.

11. The fishing reel according to claim 9 wherein the rearwardly facing surface of the housing behind the worm shaft is substantially flat and the flat rearwardly facing surface is defined cooperatively by a part of both the first and second housing parts.

12. The fishing reel according to claim 11 wherein the flat rearwardly facing surface defines the rearmost part of the fishing reel behind the worm shaft.

13. In a spinning-type fishing reel having a front and rear, spaced side walls, a line carrying spool, means for reciprocating the line carrying spool, and means for directing line onto the reciprocating line carrying spool, a housing comprising:
first and second housing parts,
one of said first and second housing parts having one piece defining a rear wall and a portion of only one of the side walls at the rear of the housing,
there being means on the rear wall to support at least a portion of the spool reciprocating means,
the other of the first and second housing parts overlying the rear wall and having one piece defining the rearmost part of the reel behind the spool reciprocating means and a portion of only the other of the side walls at the rear of the housing.

14. The housing according to claim 13 wherein the other of the first and second housing parts has a first section defining at least a portion of one of the side walls and a second section formed integrally with the first section to cover at least a part of the rear wall.

15. The housing according to claim 14 wherein the second section comprises a flat tab.

16. The housing according to claim 14 wherein the first section is made of plastic.

17. The housing according to claim 13 wherein the spool reciprocating means includes a worm shaft extending in a fore and aft direction and having spaced ends and there is a bore in the rear wall to accept one end of the worm shaft.

18. The housing according to claim 17 including a bushing to support the one end of the worm shaft and means are provided for holding the bushing in an operative position on the one end of the worm shaft with the first and second housing parts assembled.

19. The housing according to claim 18 wherein the bushing holding means includes means on the first and second housing parts for captively holding the bushing on its operative position.

20. The housing according to claim 19 wherein at least one of the first and second housing parts has an undercut to receive the bushing with the bushing in its operative position.

21. The housing according to claim 13 wherein the one of the first and second housing parts defines a cup-shaped receptacle for a reel operating mechanism and the other of the first and second housing parts substantially closes the receptacle defined by the one of the first and second housing parts.

* * * * *